(12) United States Patent
Rueger et al.

(10) Patent No.: US 10,692,524 B2
(45) Date of Patent: Jun. 23, 2020

(54) MAGNETIC TAPE DRIVE WITH A BURNISHING UNIT

(71) Applicant: INTERNATIONAL BUSINESS MACHINES CORPORATION, Armonk, NY (US)

(72) Inventors: Erik Rueger, Ockenheim (DE); Stefan Wiedemann, Kaiserslautern (DE); Markus Schäfer, Heiligenmoschel (DE); Robert Beiderbeck, Wassenberg (DE); Ole Asmussen, Henstedt-Ulzburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/433,102

(22) Filed: Jun. 6, 2019

(65) Prior Publication Data

US 2019/0325907 A1    Oct. 24, 2019

Related U.S. Application Data

(63) Continuation of application No. 15/958,393, filed on Apr. 20, 2018, now Pat. No. 10,354,686.

(51) Int. Cl.
*G11B 5/84* (2006.01)
*B24B 39/06* (2006.01)
(Continued)

(52) U.S. Cl.
CPC ............ *G11B 5/8404* (2013.01); *B24B 39/06* (2013.01); *G11B 5/00813* (2013.01); *G11B 5/40* (2013.01)

(58) Field of Classification Search
CPC ..... G11B 5/8404; G11B 5/00813; G11B 5/40; B24B 29/06
(Continued)

(56) References Cited

U.S. PATENT DOCUMENTS 5,867,352 A   2/1999  Dohmen
6,700,743 B2  3/2004  Fahimi
(Continued)

FOREIGN PATENT DOCUMENTS

DE    10146429 A1   3/2002
EP     0872829 B1   8/2004
(Continued)

OTHER PUBLICATIONS

IBM: List of IBM Patents or Patent Applications Treated as Related (Appendix P), Jun. 25, 2019, 2 pages.
(Continued)

*Primary Examiner* — Allen T Cao
(74) *Attorney, Agent, or Firm* — Sean M. Douglass

(57) ABSTRACT

The invention relates to a tape drive, and to a method and a computer program product for operating a tape drive. The tape drive may include a transport mechanism which may include a tape head. The tape drive may be adapted to receive a magnetic tape with the transport mechanism, and to transport the magnetic tape by the transport mechanism. The tape head may be adapted to perform read-write operations on an oxide side of the magnetic tape. The tape drive may include a burnishing unit, which may include a burnishing roller and a burnish controller having an abrasive shell. The burnishing roller may be installed in the tape drive upstream of the tape head such that the abrasive shell supports the received magnetic tape on the oxide side. The burnish controller may be adapted to control the movement of the burnishing roller.

16 Claims, 3 Drawing Sheets

(51) Int. Cl.
*G11B 5/008* (2006.01)
*G11B 5/40* (2006.01)

(58) Field of Classification Search
USPC .................................. 360/131, 251.1–251.5
See application file for complete search history.

(56) References Cited

U.S. PATENT DOCUMENTS

| | | | |
|---|---|---|---|
| 6,796,884 B1 | 9/2004 | Tran et al. | |
| 6,906,888 B1* | 6/2005 | Trabert | G11B 5/584 360/31 |
| 6,947,241 B1* | 9/2005 | Gill | G11B 5/584 360/72.2 |
| 7,116,506 B1* | 10/2006 | Mojica | G11B 15/06 360/71 |
| 2012/0154950 A1 | 6/2012 | Fasen | |
| 2016/0180871 A1 | 6/2016 | Brong et al. | |

FOREIGN PATENT DOCUMENTS

| | | |
|---|---|---|
| JP | 01053341 A | 3/1989 |
| JP | 2000011368 A | 1/2000 |

OTHER PUBLICATIONS

Pending U.S. Appl. No. 15/958,393, filed Apr. 20, 2018, entitled: "Magnetic Tape Drive With a Burnishing Unit", 44 pages.
Schlatter, "DLC-Based Wear Protection on Magnetic Storage Media", Diamond and Related Materials, vol. 11, (2002), pp. 1781-1787.
Sourty et al., "Chromium Oxide Coatings Applied to Magnetic Tape Heads for Improved Wear Resistance", Tribology International, vol. 36, (2003), pp. 389-396.

* cited by examiner

MAGNETIC TAPE DRIVE WITH A BURNISHING UNIT

BACKGROUND

The present invention relates to magnetic tape drives.

The growing volume of data, and the storage capacity to service IT have increased tremendously in the last few years. It is expected that this will affect the way how to plan storage strategies, besides other significant trends, including increasing data migration to cloud services, storage virtualization, deduplication, and automatic tiering. For example, a major cloud service provider is now switching to tape technology. Contemporary tape library systems include up to 128 tape drives, hosting more than 23.000 cartridges.

A tape storage provider's responsibility requires ensuring that customer data will be accessible at any time without any error impact to the greatest possible extent. However, more and more tape drive head problems show up due to the surface roughness of the tape media surface, which is caused by the curing process during manufacturing. The surface of "green media" (i.e. fresh, unused media) can be considered as acting like sandpaper, which is exceptionally harmful for the tape head elements.

Therefore, tape media surfaces, especially "green media" surfaces, lead to shortened tape head life due to abrasion of the read/write and servo elements when such rough media has been used on the tape head. The effect is exacerbated for some backup or archiving applications which require certain data to be stored on "green media", and for tape drives in a library which are provisioned for dealing predominantly with "green media".

BRIEF SUMMARY

Aspects of the present invention provide for a tape drive, a method for operating said tape drive, and a computer program implementing said method. Embodiments of the invention are given in the dependent claims. Embodiments of the present invention can be freely combined with each other if they are not mutually exclusive.

In one aspect, the invention relates to a tape drive, which may include a transport mechanism which may include a tape head. The tape drive may be adapted to receive a magnetic tape with the transport mechanism, and to transport the magnetic tape by the transport mechanism. The tape head may be adapted to perform read-write operations on an oxide side of the magnetic tape. The tape drive may include a burnishing unit, which may include a burnishing roller and a burnish controller having an abrasive shell. The burnishing roller may be installed in the tape drive upstream of the tape head such that the abrasive shell supports the received magnetic tape on the oxide side. The burnish controller may be adapted to control the movement of the burnishing roller.

In another aspect, the invention relates to a method for operating a tape drive, the tape drive may include a transport mechanism, which may include a tape head. The tape drive may receive a magnetic tape with the transport mechanism, and transport the magnetic tape by the transport mechanism. The tape head may perform read-write operations on an oxide side of the magnetic tape. The tape drive may include a burnishing unit, which may include a burnishing roller and a burnish controller having an abrasive shell. The burnishing roller may be installed in the tape drive upstream of the tape head such that the abrasive shell supports the received magnetic tape on the oxide side. The burnish controller may control the movement of the burnishing roller.

In yet another aspect, the invention relates to a computer program product which may include a computer readable storage medium having program instructions embodied therewith. The program instructions may be executable by a processor of a computer system to cause the computer system to perform a method for operating a tape drive. The tape drive may include a transport mechanism, which may include a tape head. The tape drive may receive a magnetic tape with the transport mechanism, and transport the magnetic tape by the transport mechanism. The tape head may perform read-write operations on an oxide side of the magnetic tape. The tape may include a burnishing unit having a burnishing roller and a burnish controller. The burnishing roller may include an abrasive shell. The burnishing roller may be installed in the tape drive upstream of the tape head such that the abrasive shell supports the received magnetic tape on the oxide side. The burnish controller may control the movement of the burnishing roller.

BRIEF DESCRIPTION OF THE DRAWINGS

The present invention together with the above-mentioned and other objects and advantages may best be understood from the following detailed description of the embodiments, but not restricted to the embodiments.

DETAILED DESCRIPTION

Figure 1A:
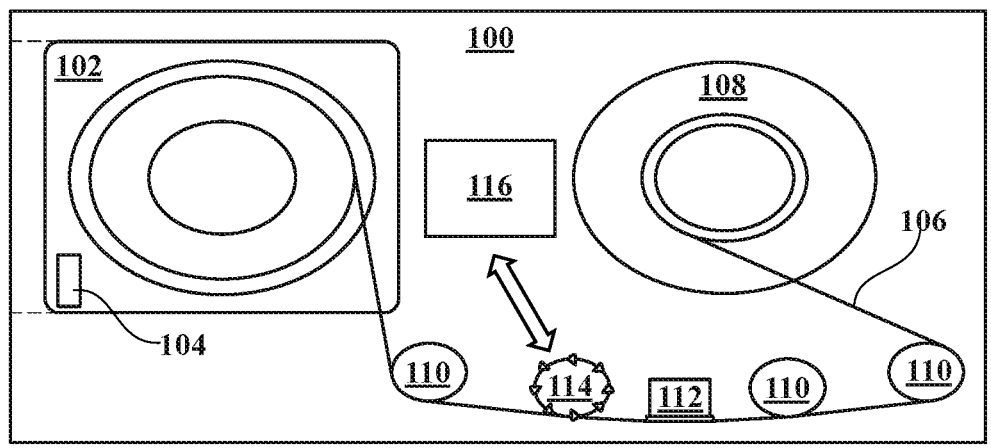
FIG. 1a depicts a schematic internal top view of a tape drive mounting a magnetic tape block diagram according to an embodiment of the invention.

When a magnetic tape is transported through the transport mechanism of a tape drive, the surface of the tape medium, which is rough as a consequence of the curing process during manufacturing, is directly in touch with the head guide assembly during the read and write process. This causes substantial abrasion at the tape head and the head guide. As a side effect, repeated usage of the tape reduces the roughness of the medium. Hence, the effect of tape head abrasion is especially pronounced in new ("green") media.

Therefore, it would be desirable to have a means for smoothening the oxide side of a magnetic tape before it comes into contact with the tape head for the first time. Preferably, the smoothening should be performed on demand, such that, for example, an unused tape can be automatically identified as such and smoothened before it comes into first contact with the head guide assembly, and that the smoothening can be skipped for a tape which has already been smoothened.

A tape drive according to embodiments of the invention may be based on various technologies for information processing on a magnetic tape medium. For instance, the tape drive may be a reel-to-reel drive, or alternatively, a tape drive adapted for mounting the tape in a cartridge.

The transport mechanism may comprise various elements for transporting and/or guiding the tape, and/or for manipulating the magnetic state of the magnetic medium (also called 'oxide') of the tape. The elements of the transport mechanism may include, without limitation, one or more rollers, e.g. an active or driven roller for tensioning the tape, or a passive roller for guiding the tape; a capstan; one or more tape heads, such as a read head, a write head, an erase head, or a tape head with combined functionality; static parts such as pins or plates; etc.

At least one side of the tape (herein also called the 'oxide side') is coated with a permanently magnetizable, reprogrammable coating, which is the magnetic medium of the tape. Performing magnetic operations such as reading and/or writing on the magnetic medium requires mounting the tape in a tight contact with the tape head. The burnishing roller according to embodiments of the invention is installed on the same side of the tape as the tape head. If the tape drive is supportive of tapes with a magnetic coating on both sides, a second one of the burnishing roller may be installed to support the second coated side of the tape in analogy to the burnishing roller on the first coated side.

Compared to an existing transport mechanism, the burnishing roller may be installed in the tape drive as an additional part of the transport mechanism. Alternatively, the burnishing roller may replace a roller of an existing transport mechanism. In preferred embodiments, the burnishing roller is a solid cylinder which is rotatable around a central axis. Being a driven part, the burnishing roller is preferably driven by an electric motor. The rotational state of the burnishing roller may be chosen independently from the movement of the magnetic tape. As used throughout this disclosure, statements involving axial and/or radial directions relate to the cylinder geometry of the burnishing roller.

The burnish controller comprises at least a processor having program instructions for controlling the movement of the burnishing roller embodied therewith, or being adapted for receiving such program instructions from a memory or a different computer device. The burnish controller may be implemented as a discrete device of the tape drive, or integrated with a larger controller unit or processor, equipped with additional functionality such as a transport controller for transporting the tape by the transport mechanism or a cartridge memory controller for performing read/write operations on a cartridge memory of a cartridge hosting the tape. The burnish controller has at least an electrical or otherwise communicative connection to the drive mechanism of the burnishing roller, enabling the burnish controller to control the movement of the burnishing roller. The burnish controller may have further electrical and/or communicative connections available for mutual signal transmission with other units, parts or elements of the tape drive.

Expressions of this disclosure relating to 'supporting the tape' are meant to denote a close physical contact between the respective part and the tape. Said close physical contact usually involves a tensile force or pressure exerted on the tape by the respective part, such that sufficient tension of the tape is generated for successful performance of the transport, but limited such that neither the carrier film (i.e. the 'web') nor the magnetic coating are damaged by the respective part. Unless noted otherwise, supporting the tape does not include reeling or wrapping the tape around the respective part supporting the tape.

It is understood that the movement of the burnishing roller be controllable in a forward and a backward direction with respect to the forward transport direction of the magnetic tape. Preferably, the burnishing roller is adapted for performing a continuous movement, i.e. other than a step motor, and for continuous variation of its state of movement.

The burnishing roller may comprise further structures in addition to the cylindrical structure comprising the abrasive shell. As a non-exhaustive example, the cylinder may be bordered by plates or cones for guiding or centering the tape on the abrasive shell.

Unless otherwise noted, the term "shell" is used herein to denote a cylinder shell, i.e. the closed, curved outer surface of a cylinder. The term "abrasive shell" is meant to include both the cylinder shell and any other parts (e.g. blades) affixed to the cylinder shell.

A magnetic tape medium is understood herein to have a predefined forward transport direction which is used for performing read-write operations of the tape head. The forward transport direction is defined by the pull direction of the tape away from the reel or cartridge where it was reeled up before insertion into the tape drive. Unless noted to the contrary, the term "transport direction" denotes said forward transport direction, notwithstanding further transport capabilities of the tape drive such as rewinding.

Furthermore, it is understood that any numbers given for continuous quantities, including speed specifications, and more specifically, indications of "zero speed" and/or "zero relative speed", are implemented within boundaries of technical uncertainty in a real system.

Embodiments of the invention may have the advantage of protecting components of a tape drive from getting damaged by use of green media, which has been recognized as a main factor for premature failing of tape drives. Due to its burnishing unit, the tape drive may allow for smoothening the oxide side of a magnetic tape if the burnishing roller is driven to counter-rotate relative to the transport direction of the tape. In addition, if the burnishing roller is driven to co-rotate relative to the transport direction of the tape, the smoothening may be suspended. Burnishing of new tape media may protect the drive comprising the burnishing unit, but also other tape drives, e.g. in a tape library, from getting damaged by unused magnetic tapes.

Embodiments of the invention may be advantageous over approaches involving static parts, such as a round pin, within the path of the tape in the tape drive. Such pin is always present for each tape and always burnishes the tape surface. In comparison, the tape drive disclosed herein features a burnishing unit which may be controlled for burnishing a tape, e.g. if a new tape with a rough coating is inserted, by rotating the burnishing roller at a lower speed of the abrasive surface relative to the current transport speed of the tape, but also for non-performance of the burnishing, e.g. if a used tape with an already burnished coating is inserted, by rotating the burnishing roller with the abrasive surface having the same speed as the current transport speed of the tape. Therefore, the burnishing unit may be used so as to extend the lifetime of the tape compared to solutions featuring permanent burnishing.

Embodiments of the invention may be advantageous over other approaches involving a tape lifter installed in the tape path upstream of the tape head. Such tape lifter has the effect of lifting up the tape so that it cannot touch the tape head while the lifter is actuated. The burnishing of the tape is a side effect of such method. In comparison, the tape drive disclosed herein features a roller with an effect switchable between burnishing and supporting the tape, both without influencing the transport path of the tape or its position relative to any other components of the transport mechanism. Furthermore, smoothening the tape while the tape head is engaged may avoid the need for additional reeling between burnishing and tape head operation.

According to embodiments, the tape can therefore be burnished just while the tape head is executing read-write operations on the magnetic medium of the tape. This may be especially advantageous for more recent tape drive technologies which require to keep the tape on the head to ensure a specified read write performance.

The burnishing operation according to embodiments of the invention is adjustable in abrasive power in response to adjusting the differential speed of the burnishing roller relative to the current transport speed of the tape.

Embodiments of the present invention may also have the advantage of a controlled removal of the debris particles caused by the burnishing. As the burnishing roller is intrinsically adapted for transporting debris away from the tape surface, the disposal of debris particles is confined to a small region of the tape drive rather than being spread throughout the tape drive in an uncontrolled, statistical process due to normal tape transport. Debris removal may also beneficially avoid cross-contamination of both tapes and tape drives with burnishing debris.

As a consequence of its controllable burnishing operation, the burnishing may be performed on demand. In conjunction with technologies involving tape management by means of tape-specific state information, an unused tape may be automatically identified as such and, in response, be smoothened before it comes into first contact with the head guide assembly. Analogously, the smoothening may be skipped e.g. for a used tape to avoid premature wear of the coating due to excessive burnishing.

Embodiments of the invention feature the burnishing unit conveniently placed inside a tape drive such that additional handling of the tape or cartridge outside of the tape drive may be avoided.

Advantageous effects of embodiments of the invention may include providing a significantly extended life time of the tape drive and the tape media; improved physical contact between tape head and medium, leading to reduced proneness to read errors and/or enhanced data integrity due to improved write quality; and a lower requirement for maintenance due to reduced proneness to data loss, drive replacements, or media replacements.

A beneficial usage scenario for the tape drive disclosed herein may be a tape library, where one or more of the tape drive according to an embodiment may be provisioned for running all new, "green" media only on these drives, which may protect other drives of the library which do not have the tape burnishing functionality.

According to an embodiment, the movement comprises spinning the burnishing roller at a lower speed of the abrasive shell compared to a current transport speed of the tape.

This may beneficially allow for smoothening the oxide side of the magnetic tape, which may be especially useful when performed with an unused magnetic tape. On a microscopic scale, the abrasive shell of the burnishing roller may cut off the sharp corners of the magnetic coating material which are usually formed and fixed to the tape surface by a curing process which is part of the manufacturing process. As used throughout this disclosure, the term 'burnishing' denotes dry smoothening of the tape surface, in contrast to surface processes such as polishing which are usually performed under wet conditions or using an agent. The burnishing of the rough tape surface may be achieved by immediate physical contact of the abrasive shell and the coating, in conjunction with a negative differential speed of the abrasive shell relative to the transport speed of the tape. A slow differential speed may result in a gentle burnishing of the coating, while a high differential speed may be chosen to perform the more aggressive smoothening of the tape surface.

According to an embodiment, the speed of the abrasive shell is between +99% and −100% of the current transport speed of the tape.

The given boundaries for the speed of the abrasive shell may define an advantageous working range for burnishing the tape surface with a low risk of damaging the tape and/or its coating. A speed below −100%, which corresponds to a relative velocity of more than twice the transport speed of the tape, may exert too high a force on both the tape and the burnishing roller, such that the risk of damaging the tape and premature wear of the abrasive shell would be unnecessarily high. An abrasive shell speed between +99% and +101% of the current transport speed of the tape may result in ineffective burnishing due to incomplete coverage of the tape surface as a consequence of too low differential velocity. Furthermore, abrasive shell velocities in excess of +101% of the current transport speed of the tape may result in incomplete debris removal of the microscopic debris particles generated by the burnishing.

According to an embodiment, the absolute value of the speed of the burnishing roller is greater than +1% of the current transport speed of the tape.

It may be advantageous to accept the range between −1% and +1% of the current transport speed of the tape from the range of possible abrasive shell speeds which may be feasible for burnishing the tape surface. Said abrasive shell speed range would mean an effective stop of the burnishing roller, which may increase the risk of insufficient debris removal by the burnishing roller. Additionally, a continuous rotation of the burnishing roller may be difficult to achieve, as rotational frequencies near zero may be inaccessible for certain drive technologies.

According to an embodiment, the abrasive shell comprises blades, each of the blades being in rigid connection with the burnishing roller, the blades being adapted to support the received magnetic tape on the oxide side.

The abrasive action of the abrasive shell on the tape surface may be achieved by the blades. A burnishing roller comprising blades may be formed as a single part by local removal of material from a precursor roller, for instance by cutting, milling, stamping, etching, or a similar structured removal process. Alternatively, the blades may be formed as separate parts, which are subsequently connected to the burnishing roller, e.g. by a gluing, welding, soldering, or other connection process. If produced as separate parts, the blades may be made of a different material than the rest of the burnishing roller, which may have the advantage that each blade may be manufactured with a higher precision, and/or the blade material may be chosen to be more expensive than the rest of the burnishing roller, in favor of beneficial properties such as improved wear resistance and/or sharper blade edges compared to a monolithic burnishing roller equipped with blades.

The capability of supporting the magnetic tape may be achieved by providing a sufficiently high number of blades. Preferably, the number of blades is chosen such that the tape is supported by at least two blades in any rotational position of the burnishing roller. Preferably, the entirety of the blades constitutes the abrasive shell of the burnishing roller.

According to an embodiment, the tape drive is supportive of magnetic tapes of a predetermined design width, each of the blades extending to at least the design width in axial direction of the roller. This may ensure that the whole width of the tape is covered by the burnishing process.

According to an embodiment, each of the blades has a concave-convex profile in a radial cross-sectional plane of the burnishing roller, wherein, for a given blade of the blades, the concave-convex profile is oriented such that the concave portion faces upstream in case that the given blade is supporting the tape.

A blade having a concave-convex profile is understood herein as having a boundary comprising two sections which are not adjoining the rest of the burnishing roller, wherein one of the two sections is concave and the other one of the two sections is convex. The concave and convex sections of the profile are oriented such that, for each blade, the edge of the blade points to the opposite direction of the transport direction of the tape. In other words, each of the blades has a 'shark tooth profile' where the tip of the tooth (i.e., the edge of the blade) is bent towards the tape transport direction. Said concave convex profile may have the advantage that the edges facing upstream have the desired burnishing effect on the tape surface if the burnishing roller is rotated at a negative differential velocity relative to the transport speed of the tape, while the tape is supported by the concave part of the profile, i.e. without burnishing, in case that the differential speed of the burnishing roller relative to the tape is zero or positive. This may advantageously enable a suppression of the burnishing effect of the burnishing roller in the case that a burnishing is not desirable, e.g. if a tape has already been burnished and a repetition of the burnishing is not necessary. Hence, said concave convex profile may lead to an extended lifetime of the tape and/or the burnishing roller.

It is understood that the blade may be machined with different profiles which may also have a burnishing effect on a rough tape surface. For instance, the blade may be manufactured with a triangular or a square shape, which may enable a more aggressive burnishing. On the other hand, a more gentle burnishing may be achieved if the blades have a rounded profile, e.g. a semi-circular profile, which may provide a burnishing effect by bending microscopic peaks of a rough tape surface over rather than cutting them off. It may also be considered to design the abrasive shell with blades of two or more different profiles, e.g. in an alternating pattern, such that different microscopic effects may be implemented on a single burnishing roller.

According to an embodiment, each of the blades comprises an edge, the edge being parallel to the rotational axis of the burnishing roller.

This may reduce premature wear of the burnishing roller and/or the tape surface to a minimum by minimizing the contact time between burnishing roller and tape surface to a minimum. Also, said parallel orientation of the edges may reduce the possibility that debris particles created by the burnishing process are accidentally worn away across the width of the tape instead of being removed by the rotating burnishing roller. Furthermore, straight blades may be manufactured as separate parts in an easy and cost effective way, compared to curved blades, for which it may be easier to be manufactured by a removal process from a precursor roller as mentioned further above.

According to an embodiment, each of the blades comprises an edge, the edge being tilted up to 45 degrees against the rotational axis of the burnishing roller, the tilt angle being equal for all of the blades.

Inclined against the rotational axis by a constant tilt angle, the blades form a helical pattern on the abrasive shell. This may improve the efficiency of debris removal as debris particles may receive an additional axial velocity component.

According to an embodiment, the blades form a circular envelope in a radial cross-sectional plane of the burnishing roller, the envelope being centered in the rotational axis of the burnishing roller, the envelope having a constant radius over the whole axial dimension of the burnishing roller.

As the circular envelope is identical in an arbitrary radial cross-sectional plane of the burnishing roller, this implies that all of the blades are of an identical shape, including an identical radial dimension above the cylindrical surface of the bulk of the burnishing roller. Hence, the abrasive shell assumes a uniform structure, which may enable a uniform distribution of abrasive power across the whole width of the tape.

According to an embodiment, the rotational axis of the burnishing roller is perpendicular to a transport direction of the tape.

This may be an alternative way of achieving a gentle abrasion by minimizing the contact time and/or area between tape and abrasive shell.

According to an embodiment, the tape drive is further adapted for receiving a cartridge, the cartridge comprising the magnetic tape and a cartridge memory, the cartridge memory having stored therein state information specific to the tape, the tape drive further comprising a cartridge memory controller, the cartridge memory controller being adapted for performing read-write operations on the cartridge memory, the tape drive being further adapted for establishing a communicative connection between the cartridge memory controller and the cartridge memory, the burnish controller being further adapted for performing read-write operations on the cartridge memory using the cartridge memory controller, the movement comprising spinning the burnishing roller at a lower speed of the abrasive shell compared to a current transport speed of the tape in case the state information indicates the tape as unused, the movement further comprising spinning the burnishing roller at equal speed of the abrasive shell compared to the current transport speed of the tape in case the state information indicates the tape as used.

State information stored on cartridge memory comprises at least some information which is indicative of whether the tape is unused (i.e., a virgin, brand new tape has been inserted into the drive) or used (i.e., having been mounted in the transport mechanism of a tape drive and having been transported with tape head contact for at least one time). Such usage information may be present in various ways, for instance as a (binary) flag, a set of logical positions (such as beginning of tape and/or end of tape and a logical position of the most recent write operation) between which a difference can be calculated for inferring the usage state, a set of timestamps or dates (such as a manufacturing date and a date of most recent usage) between which a difference can be calculated for inferring the usage state, etc. Of course, the state information may comprise further information, such as information indicating the manufacturer of the tape, the tape coating technology, an identifier of the tape within a tape library, etc. As used herein, an unused tape is conveniently dubbed 'green', and a used tape is dubbed 'red'. Said conditional burnishing of an unused tape may advantageously protect the head guide assembly of the tape drive, including the tape head, from premature wear due to the exceptionally rough surface of green magnetic tape media. In addition, said conditional non-execution of the burnishing may protect the tape and/or the burnishing roller from premature wear due to excessive burnishing.

According to an embodiment, the tape drive is further adapted for detecting a removal of the tape, the state information further comprising an interrupt position, the cartridge memory controller being further adapted, in case that the state information indicates the tape as unused and that a cartridge removal is detected after the read-write operations of the tape head were performed until a current logical position less than a predetermined logical end-of-tape position of the tape, for updating the interrupt position to the current logical position, the burnish controller being further adapted, in case that the tape drive receives the cartridge again and that the interrupt position is detected to be less than the predetermined logical end-of-tape position, for spinning the burnishing roller at equal speed of the abrasive shell compared to the current transport speed of the tape if the current logical position of the tape is less than the detected interrupt position, and for spinning the burnishing roller at a lower speed of the abrasive shell compared to a current transport speed of the tape if the current logical position is equal to or greater than the detected interrupt position.

Tracking the interrupt position of a partially used tape may beneficially enable continuing the burnishing for that portion of the tape which has not yet been burnished. If, for instance, a standard tape handling procedure of the tape drive requires a partially used cartridge to be marked as used, it could be wrongly concluded at a later time, upon reinsertion of the partially used tape, that the full length of the tape was burnished during an earlier recording session, thus risking that the unused part of the tape exerts the tape head to excessive wear. This may be avoided by continuation of the burnishing starting from the logical interrupt position as described.

According to an embodiment, the burnish controller is further adapted, in case that the state information indicates the tape as unused and that a cartridge removal is detected after the read-write operations of the tape head were performed until a current logical position less than a predetermined logical end-of-tape position of the tape, for updating the state information in the cartridge memory so as to indicate the given magnetic tape as partially used.

This may be a beneficial extension to a binary solution indicating the used state of a magnetic tape. A binary flag indicates the tape to be either used (red) or unused (green). However, if the tape is marked as used, it may be wrongly concluded that there is no free space left on the tape which is in fact partially used. On the other hand, if the partially used tape were marked as unused, it may be wrongly concluded that the tape had a higher storage capacity than it actually does. Moreover, a used tape may be wrongly considered as having been fully burnished at an earlier time, and vice versa. Hence, partial usage of a tape, which is dubbed 'yellow' herein, may enable an easier identification of the actual usage history of a given tape, and accordingly, of the burnishing history of that tape.

According to an embodiment, the movement further comprises, in case the state information indicates the tape as at least partially used, spinning the burnishing roller at a speed such that the speed of the abrasive shell is between +99% and +50% of the current transport speed of the tape.

This may enable an extended tape head protection by cleaning a used tape from debris particles of an earlier burnishing operation and/or where debris on the tape surface caused by normal tape operation. The given velocity limitation may advantageously reduce the abrasive power of the burnishing roller as the debris particles potentially existing on the tape surface do not have to be broken or cut from the cured tape coating material. Hence, the lifetime of the tape and/or the burnishing roller may be extended by the described gentle cleaning operation compared to highly abrasive burnishing which may be feasible to protect the tape head from the abrasive surface of a green medium.

According to an embodiment, the burnish controller is further adapted for setting the speed of the burnishing roller based on information associated with the tape and selected from the group of: manufacturing metadata, a count-up value indicating a number of times the burnishing or the read-write operations of the tape head have been completed for the entirety of logical positions between a predetermined logical beginning-of-tape position of the tape and a predetermined logical end-of-tape position of the tape, a count-down value indicating a number of allowable repetitions of the cleaning, state information indicative of the usage of the tape, and a combination thereof.

This may enable a customization of the burnishing operations on a case-by-case basis. In a non-exhaustive example, the burnish controller may discern between different tape manufacturers who are known to produce tapes with differences in surface roughness. In a more specific example, the burnish controller has manufacturer-specific cleaning programs for tapes which have been once fully burnished, e.g. at an abrasive shell velocity of −50% of the tape transport velocity (corresponding to a differential burnishing velocity of −150%). When such a tape is reinserted into the tape drive, the burnish controller determines from the cartridge memory that a burnishing operation has been completed one time for the whole length of the tape, and determined subsequently, e.g. by a table lookup, that tapes of the respective manufacturer are to be cleaned at 50% abrasive shell velocity relative to the tape transport velocity upon their first reinsertion, and 10% abrasive shell velocity compared to the tape transport velocity upon their second reinsertion. As the inserted tape has been fully burnished once, the burnish controller actuates the burnishing roller to attain an abrasive shell speed of +50% of the current tape transport velocity. Embodiments of the tape drive implementing individualization of the burnishing or cleaning on a by case basis may therefore advantageously enhance the tape head protection independent of variations in tape quality or history.

According to an embodiment, the tape drive further comprises a rotary drive, the rotary drive being adapted for spinning the burnishing roller, the burnish controller being adapted for controlling the movement of the burnishing roller by actuating the rotary drive.

Driving the burnishing roller via a rotary drive may enable to implement further mechanical functionality to optimize the operation of the burnishing roller. Besides being a pure motor (preferably, an electric motor), the rotary drive may further comprise a gearing mechanism, a fly wheel, a torque limiter, a load compensation mechanism, and/or further mechanical sub-units with long advantageous effects, such as protecting the tape from getting stuck, and/or enabling the burnishing roller to run more quietly.

According to an embodiment, the tape drive further comprises a debris collector pad, the debris collector pad being arranged relative to the burnishing roller such that the burnishing roller is gravitationally discharged to the debris collector pad.

Said debris collector pad may provide the advantage of preventing debris from the burnishing operation from getting transported into other parts of the tape drive, including cross-contamination of tapes inserted into the tape drive. This may extend the lifetime of all parts, elements, units and/or devices of the tape drive, and/or improve data integrity for all tapes in the library.

According to an embodiment, the abrasive shell comprises between 10 and 40 ones of the blades. A lower limit of 10 blades may be advantageous to ensure that at least two blades are always contacting the tape. This way, the tape tension may be distributed more evenly, lowering the risk of damaging the tape due to excessive local tension. An upper limit of 40 blades may facilitate accurate and cost-effective manufacturing of the burnishing roller, and may also ensure that debris removal is not hampered by too high a blade density. Preferably, the number of blades is chosen such that at least a design blade density is contacting the tape in any rotational position of the burnishing roller.

In a preferred embodiment, the tape drive is an 3580 IBM LTO tape drive or a 3592 IBM® tape drive (TS11xx) (IBM is a registered trademark of International Business Machines, Corp.). Both can be installed in different kinds of libraries like IBM® TS3500, TS4500, TS3310 and TS3x00 (IBM is a registered trademark of International Business Machines, Corp.). The LTO IBM® tape drive is also available as a standalone device and as a server device (IBM is a registered trademark of International Business Machines, Corp.). In each combination the LTO IBM® drive brick (bare drive) provides always the same hardware and functionality (IBM is a registered trademark of International Business Machines, Corp.). Any kind of the 3592 IBM® tape drive and LTO IBM® tape drive generation may be used to store digital data on an appropriate data cartridge (magnetic tape) using digital recording (IBM is a registered trademark of International Business Machines, Corp.).

According to an embodiment, the burnishing roller is arranged with its rotational axis perpendicular to tape transport direction, the burnishing roller extending to between 13 and 16 millimeters in axial direction of the burnishing roller in case the tape drive is supportive of the Linear Tape-Open, LTO, standard. With an LTO tape design width of 12.650±0.006 mm, this may enable the burnishing roller to burnish the tape across the whole width of the tape without missing the boundaries.

According to an embodiment, the blades are made of or coated with a material selected from the group of: a hardened metal alloy, and a ceramic. Due to their hardness, materials selected from this group may be an advantageous choice for reducing abrasive wear of the blades as a consequence of normal operation.

Figure 1B:
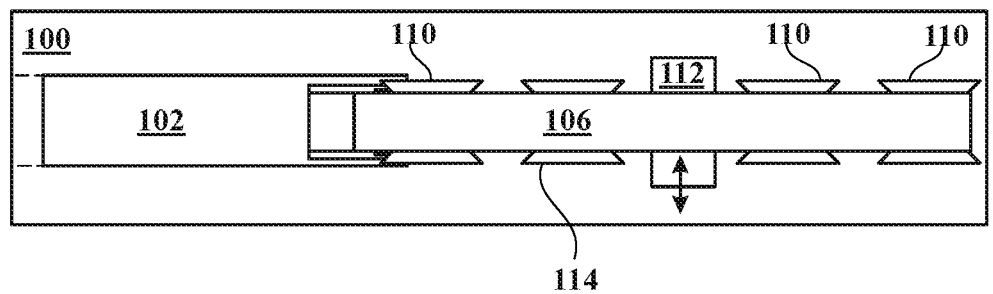
FIG. 1b depicts a schematic internal side view of a tape drive mounting a magnetic tape block diagram according to an embodiment of the invention.

Referring to FIGS. 1a and 1b, a schematic diagram of the basic internal parts of a tape drive 100 mounting a magnetic tape 106 and equipped with described burnishing functionality is depicted. Parts typically used in magnetic tape drives may not be shown in favor of ease of illustration. FIG. 1a illustrates a cut through top view of the tape drive 100 is in a plane comprising the mounted tape 106. FIG. 1b illustrates a side view on the transport mechanism of the same tape drive 100, the side view corresponding to a bottom-up view of FIG. 1a. The front of the tape drive 100 is oriented to the left in both FIGS. 1a and 1b.

In the upper panel, a cartridge 102 comprising the tape 106 and a cartridge memory 104 is inserted into the tape drive 100 on the upper left. The tape 106 is partially reeled off, guided in a tensioned manner out of the cartridge 102 and through the transport mechanism in the lower part of the tape drive 100, and reeled up on a reel 108 without cartridge 102 shown on the upper right of the tape drive 100. The transport mechanism comprises four rollers 110, 114, arranged in a sequence from the center of the tape drive 100 to the right, and a tape head 112 located in the middle between the second roller 114 and the third roller 110.

The second roller from the left is a burnishing roller 114 equipped with a (preferably electric) rotary drive and an abrasive shell formed by numerous blades. The burnishing roller 114 may be a device which adds to a former transport mechanism design based on three rollers. Alternatively, it may replace a conventional roller which used to be located at the same position in former transport mechanism designs. The size of the blades shown is exaggerated for illustrative purposes.

The rotary drive is in electric or communicative connection (illustrated by a double arrow) with a burnish controller 116 located between the cartridge 102 and the open reel 108 at the upper center of the tape drive 100. The burnish controller 116 is adapted for using the connection to operate the rotary drive, such that the burnishing roller 114 can burnish the magnetic coating of the tape 106 with its abrasive shell in at least one rotational direction of the burnishing roller 114. The depicted position of the burnish controller 116 has been chosen for illustrative purposes only; it may likewise be installed at any other suitable location, e.g. on an interface control board of the tape drive 100.

The burnish controller 116 comprises at least a processor having program instructions for controlling the movement of the burnishing roller 114 embodied therewith, or being adapted for receiving such program instructions from a memory or a different computer device.

In the lower panel, the tape 106 is viewed in front of the transport mechanism. Each of the four rollers 110, 114 is equipped with two conical sections bordering the central cylindrical part of the respective roller, thus guiding and centering the tape 106 on the rollers 110, 114 in axial direction. The rollers 110, 114 are arranged with their respective rotational axis perpendicular to tape transport direction. A double arrow indicates a vertical degree of freedom for the tape head 112.

Figure 2:
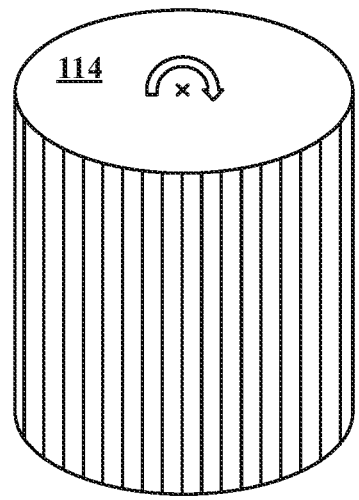
FIG. 2 depicts a schematic view of a burnishing roller comprising blades according to an embodiment of the invention.

Referring to FIG. 2, a schematic drawing showing a cylindrical structure adapted for being used as a burnishing roller 114 or at least its central part in axial direction is depicted. The center of rotation of the cylinder is indicated by a cross, with an arrow indicating a rotational degree of freedom. For implementation as a burnishing roller 114, a borehole may be driven through the center for mounting the cylinder on a rotatable pin or axis. The cylinder shell comprises a plurality of straight, equidistant, axially parallel blades, which are indicated by straight lines in the Figure. The blades form the abrasive shell of the burnishing roller 114 and comprise sharp edges adapted for cutting a body in immediate proximity at least in one rotational direction of the roller 114.

Figure 3:
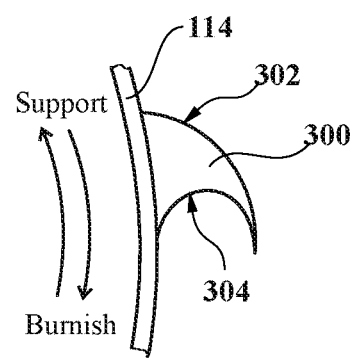
FIG. 3 depicts a schematic radial cross section through a blade with concave-convex profile according to an embodiment of the invention.

Referring to FIG. 3, a radial cut through of burnishing roller 114 comprising an abrasive shell of blades with a concave-convex profile is depicted. The cut is zoomed on a single blade 300. In the orientation shown in the Figure, the concave section 304 of the blade 300 contour faces downward and the convex section 302 faces upward. To the left of the Figure, a clockwise arrow indicates that, in case the burnishing roller 114 is pressed against a tape in bottom-up transport, rotation of the burnishing roller 114 at lower speed of the abrasive shell compared to the current transport speed of the tape may result in the sharp edge cutting off microscopic peaks from the rough coating. Left of this arrow, a counterclockwise arrow indicates that rotation of the burnishing roller 114 at equal or higher speed of the abrasive shell compared to the current transport speed of the tape may result in the convex section 302 of the blade 300 supporting the tape without blade operation. In addition, it may be possible to achieve a gentle treatment of the coating (bending of microscopic peaks instead of cutting) at positive differential speed of the abrasive shell with respect to the tape.

Figure 4:
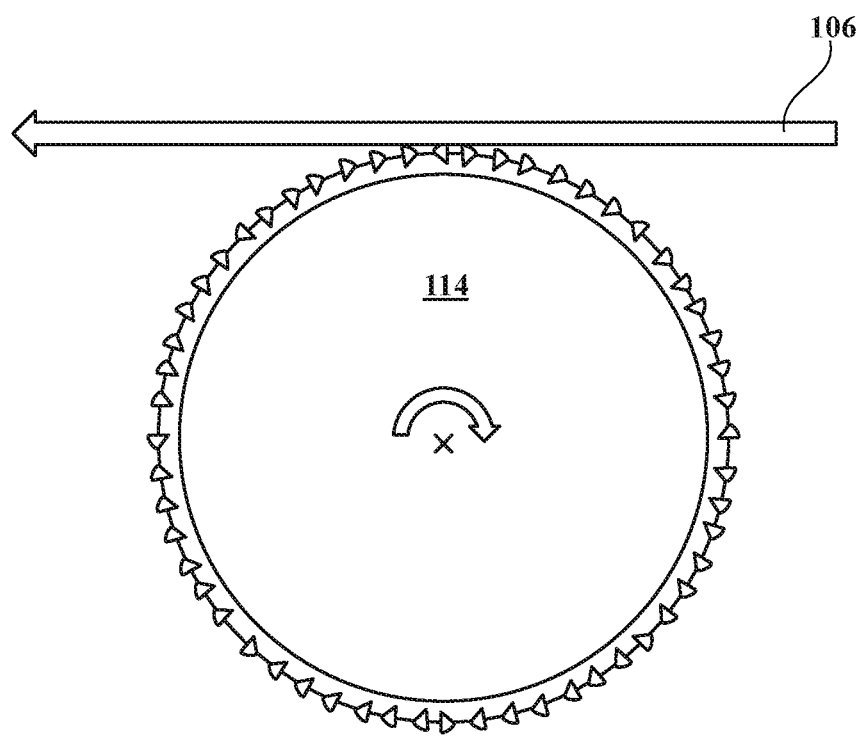
FIG. 4 illustrates burnishing operation of the burnishing roller according to an embodiment of the invention.

Referring to FIG. 4, a schematic illustration of a burnishing roller 114 being operated in burnishing mode is depicted. The upper part of the Figure shows a tape 106 being transported alongside the burnishing roller 114 such that at least two blades of the abrasive surface are contacting the magnetic medium of the tape 106. The transport direction of the tape 106 is from right to left, as indicated by an arrow head on the left end of the depicted portion of the tape 106. The central axis of the burnishing roller 114 is indicated by a cross in the center of the roller 114. A clockwise arrow indicates that the burnishing roller 114 has a negative differential speed (i.e. slower than the tape 106) of the abrasive shell compared to the current transport speed of the tape 106. As pointed out further above, this does not necessarily mean that the roller 114 be rotating in clockwise direction. Rather, FIG. 4 is to be understood as being viewed in the frame of reference of the tape 106.

In analogy to the specific design shown in FIG. 3, the blades of FIG. 4 are designed so as to feature a preferred cutting direction. The blades are fixed to the burnishing roller 114 in an orientation such that burnishing of the tape surface may be achieved if the blades contacting the tape surface are moved in upstream direction of the tape 106. In FIG. 4, this is achieved by the negative differential speed of the abrasive shell relative to the transport speed of the tape 106.

Figure 5:
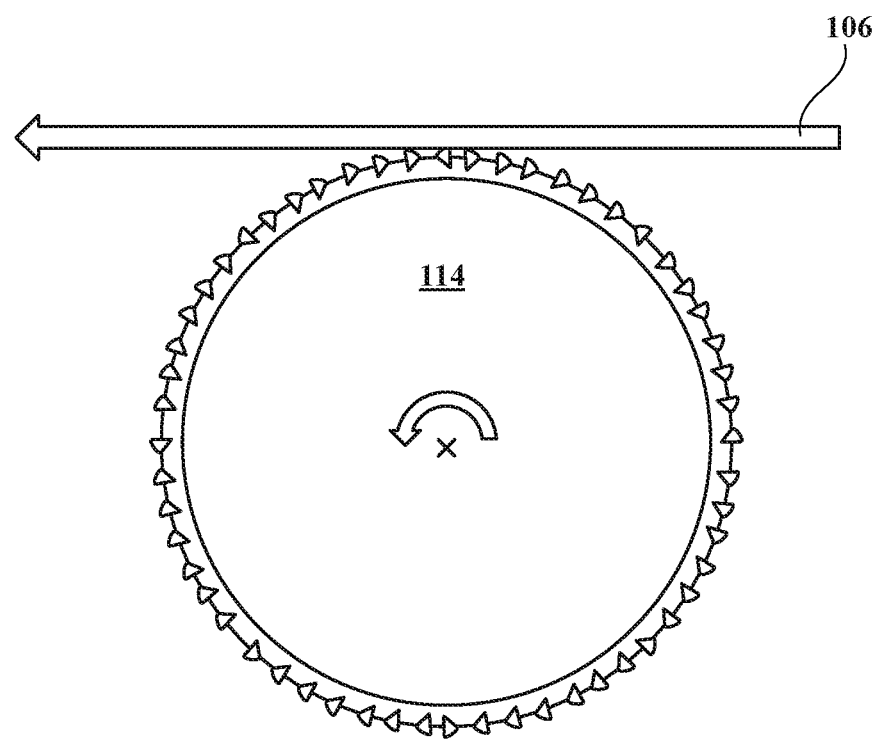
FIG. 5 illustrates supporting operation of the burnishing roller according to an embodiment of the invention.

Referring to FIG. 5, a schematic illustration of a burnishing roller 114 being operated in tape support mode is depicted. The upper part of the Figure shows a tape 106 being transported alongside the burnishing roller 114 such that at least two blades of the abrasive surface are contacting the magnetic medium of the tape 106. The transport direction of the tape 106 is from right to left, as indicated by an arrow head on the left end of the depicted portion of the tape 106. The central axis of the burnishing roller 114 is indicated by a cross in the center of the roller 114. A counterclockwise arrow indicates that the burnishing roller 114 has zero differential speed (i.e. same speed as the tape 106) of the abrasive shell compared to the current transport speed of the tape 106. Viewed in the frame of reference of the tape drive housing, this means that the burnishing roller 114 is in counterclockwise rotation.

In analogy to the specific design shown in FIG. 3, the blades of FIG. 5 are designed so as to feature a preferred cutting direction. The blades are fixed to the burnishing roller 114 in an orientation such that burnishing of the tape surface may be achieved if the blades contacting the tape surface are moved in upstream direction of the tape 106. In FIG. 5, burnishing is suppressed due to the zero differential speed of the abrasive shell relative to the transport speed of the tape 106. Rather, the burnishing roller 114 may feature an effect of supporting the tape 106 due to the same-speed physical contact between blades and magnetic tape surface.

Figure 6:
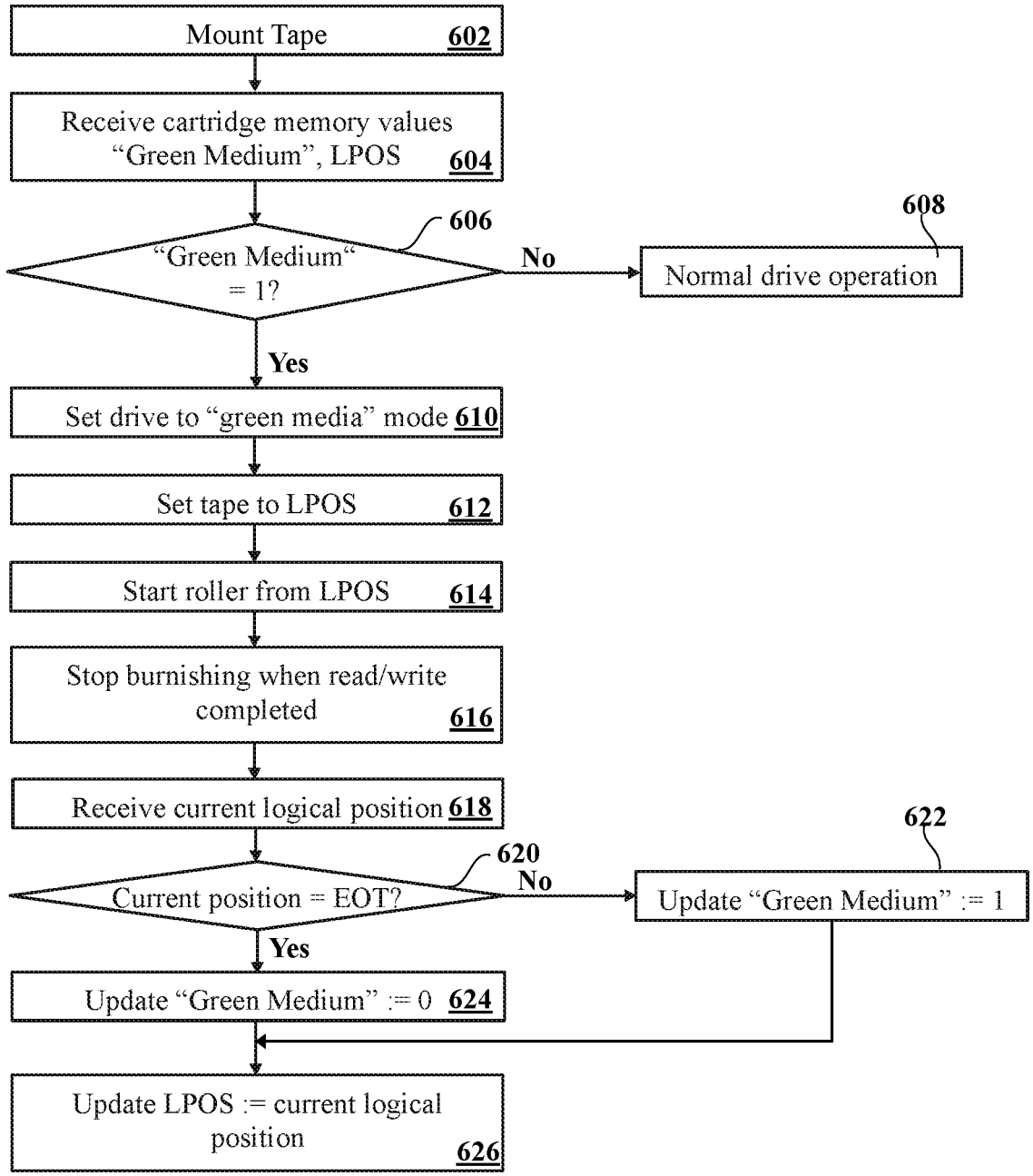
FIG. 6 depicts a flow chart for illustrating a method for operating the tape drive according to an embodiment of the invention.

Referring to FIG. 6, a flowchart illustrating a method of operating a tape drive 100 which combines several benefi-cial effects previously described is depicted. The method can be executed for the purpose of reducing premature abrasion of a tape head 112 of the tape drive 100, wherein the tape drive 100 comprises a transport mechanism (including tape head 112), a cartridge memory controller, and a burnishing unit. The tape drive is adapted for receiving a cartridge 102 comprising a magnetic tape 106 and a cartridge memory 104, for mounting the magnetic tape 106 with the transport mechanism, for transporting the mounted magnetic tape 106 using the transport mechanism, and for using the tape head 112 for performing read-write operations on the oxide side of the transported magnetic tape 106.

The burnishing unit comprises a burnishing roller 114 and a burnish controller 116. The burnishing roller 114 comprises an abrasive shell and is installed in the tape drive 100 upstream of the tape head 112 such that it supports the mounted magnetic tape 106 on the oxide side. The burnish controller 116 is adapted for controlling the movement of the burnishing roller 114. The cartridge memory 104 has stored therein tape-specific information which includes a state information indicating at least a past usage of tape 106 and a logical position indicator (LPOS) indicating the farthest logical position (measured from a beginning-of-tape position, BOT) where burnishing has been performed at least once. The cartridge memory controller is adapted for performing read-write operations on the cartridge memory 104, including updating the tape-specific information.

The depicted method is based on a convention defining a tape as used if burnishing has been completed at least once for the whole length of the tape, i.e. between the logical positions BOT and EOT (end of tape). In the implementation illustrated by FIG. 6, the state information further includes a "Green Medium" value indicating the used state with the value of one if the tape 106 contains a section which has not yet been burnished, and zero if burnishing has been completed for the full length of the tape 106.

The method illustrated by FIG. 6 starts at step 602 with mounting the tape 106 of a given received cartridge 102 in the transport mechanism, and reading the state information from the cartridge memory 104 using the cartridge memory controller. Referring to step 604, the burnish controller 116 receives the values LPOS and "Green Medium" from or with the state information (e.g. by passing a read command to the cartridge memory controller, or by listening on an interface with a main controller of tape drive 100) and checks, at step 606, whether "Green Medium" is one or zero.

Referring to step 608, if the full length of the tape 106 has already been burnished, i.e. "Green Medium"=0, the burnish controller 116 continues with "normal mode" while the tape drive 100 performs its usual function, i.e. chiefly transporting the tape 106 in forward direction, the tape head 112 performing read-write operations on the oxide side of the transported tape 106 during the transport as usual. In normal mode, burnishing is suppressed until the cartridge 102 is removed from the drive, e.g. by spinning the burnishing roller 114 at zero speed of the abrasive shell relative to the current transport speed of the tape 106, or by disengaging the burnishing roller 114 from the tape 106 before transport is started.

Referring to step 610, if "Green Medium"=1, the burnish controller 116 continues to work in "green media" mode where burnishing is continued as soon as the tape position reaches LPOS. FIG. 6 shows a general case where the tape 106 has been written upon up to a certain transport offset, but the writing was completed before EOT was reached. This is indicated by the state information comprising "Green Medium"=1 and LPOS=(BOT+offset)<EOT.

Referring to step 612, as tape transport starts from BOT, the burnish controller 116 suppresses burnishing as explained above while the current logical position is below LPOS. Referring to step 614, if the current position reaches LPOS, the burnish controller 116 starts to burnish the oxide side of the transported tape 106, e.g. by engaging the burnishing roller 114 and/or spinning the burnishing roller 114 at a lower speed of the abrasive shell relative to the current transport speed of the tape 106, while the current logical position is greater than LPOS.

When the read-write operations of tape head 112 are finished, the burnish controller 116 stops the burnishing process (e.g. by halting, disengaging or co-rotating the burnishing roller 114) at step 616 and receives the current logical position of the tape 106 at step 618. If the end of tape 106 has not been reached at step 610, the burnish controller 116 sets the "Green Medium" value to one at step 622. In case the current logical position equals EOT at step 620, the burnish controller 116 sets the "Green Medium" value to zero at step 624. In both cases, the burnish controller 116 updates LPOS to the current logical position of the tape 106 at step 626. Updating steps 622-626 may be performed in various ways, including passing a write command to the cartridge memory controller, or writing the new values to a memory of a main controller of the tape drive 100 for updating the cartridge memory 104 at a later time.

In a special case, the tape 106 inserted into the tape drive 100 is blank, which is indicated by the state information comprising "Green Medium"=1 and LPOS=BOT. In this case, step 612 is accomplished from the beginning and the burnish controller starts the burnishing operation right away.

The method illustrated by the flowchart of FIG. 6 may have the effect that a green medium be burnished up to the tape position where the read-write process of the tape head 112 is interrupted. If a not fully burnished tape 106 is reinserted into tape drive 100, e.g. if data is to be appended at the interrupt position, the burnishing may get skipped for the portion of the tape 106 which was already burnished, and continued for the portion which has not yet been burnished. The process described above may also be deployed if a the tape drive 100 is loading a cartridge 102 for any other process (tape positioning, etc.).

As described in detail above, with reference to the figures, aspects of the present invention provide for a tape drive, a method for operating said tape drive, and a computer program implementing said method. Embodiments of the invention are given in the dependent claims. Embodiments of the present invention can be freely combined with each other if they are not mutually exclusive.

In one aspect, the invention relates to a tape drive, comprising a transport mechanism, the transport mechanism comprising a tape head, the tape drive being adapted for receiving a magnetic tape with the transport mechanism, and for transporting the magnetic tape by the transport mechanism, the tape head being adapted for performing read-write operations on an oxide side of the magnetic tape, the tape drive further comprising a burnishing unit, the burnishing unit comprising a burnishing roller and a burnish controller, the burnishing roller comprising an abrasive shell, the burnishing roller being installed in the tape drive upstream of the tape head such that the abrasive shell supports the received magnetic tape on the oxide side, the burnish controller being adapted for controlling the movement of the burnishing roller.

In another aspect, the invention relates to a method for operating a tape drive, the tape drive comprising a transport mechanism, the transport mechanism comprising a tape head, the tape drive being adapted for receiving a magnetic tape with the transport mechanism, and for transporting the magnetic tape by the transport mechanism, the tape head being adapted for performing read-write operations on an oxide side of the magnetic tape, the tape drive further comprising a burnishing unit, the burnishing unit comprising a burnishing roller and a burnish controller, the burnishing roller comprising an abrasive shell, the burnishing roller being installed in the tape drive upstream of the tape head such that the abrasive shell supports the received magnetic tape on the oxide side, the burnish controller being adapted for controlling the movement of the burnishing roller, the method comprising: receiving the magnetic tape with the transport mechanism; transporting the magnetic tape by the transport mechanism; and controlling the movement of the burnishing roller during the transport.

In yet another aspect, the invention relates to a computer program product comprising a computer readable storage medium having program instructions embodied therewith, the program instructions being executable by a processor of a computer system to cause the computer system to perform a method for operating a tape drive, the tape drive comprising a transport mechanism, the transport mechanism comprising a tape head, the tape drive being adapted for receiving a magnetic tape with the transport mechanism, and for transporting the magnetic tape by the transport mechanism, the tape head being adapted for performing read-write operations on an oxide side of the magnetic tape, the tape drive further comprising a burnishing unit, the burnishing unit comprising a burnishing roller and a burnish controller, the burnishing roller comprising an abrasive shell, the burnishing roller being installed in the tape drive upstream of the tape head such that the abrasive shell supports the received magnetic tape on the oxide side, the burnish controller being adapted for controlling the movement of the burnishing roller, the method comprising: receiving the magnetic tape with the transport mechanism; transporting the magnetic tape by the transport mechanism; and controlling the movement of the burnishing roller during the transport.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A tape drive, comprising:
    a transport mechanism, the transport mechanism comprising a tape head, the tape drive being adapted for receiving a magnetic tape with the transport mechanism, and for transporting the magnetic tape by the transport mechanism, the tape head being adapted for performing read-write operations on an oxide side of the magnetic tape; and
    a burnishing unit, the burnishing unit comprising a burnishing roller and a burnish controller, the burnishing roller comprising an abrasive shell, wherein the abrasive shell comprises blades, the blades having at least two different profiles, the blades being in rigid connection with the burnishing roller, the blades being adapted to support the received magnetic tape on the oxide side, the burnishing roller being installed in the tape drive upstream of the tape head such that the abrasive shell supports the received magnetic tape on the oxide side, the burnish controller being adapted for controlling movement of the burnishing roller.

2. The tape drive as in claim 1, wherein the movement of the burnishing roller comprises spinning the burnishing roller at a lower speed of the abrasive shell compared to a current transport speed of the magnetic tape.

3. The tape drive of claim 1, wherein at least two blades in any rotational position of the burnishing roller support the received magnetic tape on the oxide side.

4. The tape drive of claim 1, wherein the blades are made from at least one of the group consisting of: a hardened metal alloy, or a ceramic.

5. A method for operating a tape drive comprising:
receiving a magnetic tape, by a tape drive, the tape drive comprising a transport mechanism having a tape head and a burnishing unit, the tape head configured for performing read-write operations on an oxide side of the magnetic tape, the burnishing unit having a burnishing roller and a burnish controller, the burnishing roller having an abrasive shell, wherein the abrasive shell comprises blades, the blades being in rigid connection with the burnishing roller, the blades being adapted to support the received magnetic tape on the oxide side;
transporting the magnetic tape by the transport mechanism; and
controlling, by the burnish controller, movement of the burnishing roller during the transport of the magnetic tape by spinning the burnishing roller at a lower speed of the abrasive shell compared to a current transport speed of the magnetic tape.

6. The method of claim 5, further comprising:
receiving a cartridge, by the tape drive, the tape drive having a cartridge memory controller, the cartridge comprising the magnetic tape and a cartridge memory, the cartridge memory having stored therein state information specific to the tape;
performing, by the cartridge memory controller, read-write operations on the cartridge memory;
establishing, by the tape drive, a communicative connection between the cartridge memory controller and the cartridge memory; and
performing, by the burnish controller, read-write operations on the cartridge memory using the cartridge memory controller by spinning the burnishing roller at a lower speed of the abrasive shell compared to a current transport speed of the magnetic tape in case the state information indicates the magnetic tape is unused.

7. The method of claim 6, further comprising:
performing, by the burnish controller, read-write operations on the cartridge memory using the cartridge memory controller by spinning the burnishing roller at an equal speed of the abrasive shell compared to the current transport speed of the magnetic tape in case the state information indicates the magnetic tape as used.

8. The method of claim 6, further comprising:
detecting, by the tape drive, removal of the magnetic tape wherein the state information further comprises an interrupt position;
updating, by the cartridge memory controller, the interrupt position to the current logical position, when the state information indicates the magnetic tape as unused and that a removal of the cartridge is detected after the read-write operations of the tape head were performed until a current logical position less than a predetermined logical end-of-tape position of the magnetic tape;
receiving, by the tape drive, the removed magnetic tape;
detecting, by the tape drive, the interrupt position is less than the predetermined logical end-of-tape position;
spinning, by the burnish controller, the burnishing roller at equal speed of the abrasive shell compared to the current transport speed of the magnetic tape if the current logical position of the magnetic tape is less than the detected interrupt position; and
spinning, by the burnish controller, the burnishing roller at a lower speed of the abrasive shell compared to a current transport speed of the magnetic tape if the current logical position is equal to or greater than the detected interrupt position.

9. The method as in claim 8, further comprising:
detecting, by the tape drive, the state information indicates the magnetic tape as unused and that a removal of the cartridge is detected after the read-write operations of the tape head were performed until a current logical position less than a predetermined logical end-of-tape position of the magnetic tape;
updating, by the burnish controller, the state information in the cartridge memory so as to indicate the magnetic tape as partially used.

10. A method as in claim 5, further comprising:
spinning, by a rotary drive, the burnishing roller, the burnish controller being adapted for controlling the movement of the burnishing roller by actuating the rotary drive.

11. A computer program product for operating a tape drive, the computer program product comprising:
a computer-readable storage medium having program instructions embodied therewith, wherein the computer readable storage medium is not a transitory signal per se, the program instructions comprising:
receiving a magnetic tape, by a tape drive, the tape drive comprising a transport mechanism having a tape head and a burnishing unit, the tape head configured for performing read-write operations on an oxide side of the magnetic tape, the burnishing unit having a burnishing roller and a burnish controller, the burnishing roller having an abrasive shell, wherein the abrasive shell comprises blades, the blades being in rigid connection with the burnishing roller, the blades being adapted to support the received magnetic tape on the oxide side;
transporting the magnetic tape by the transport mechanism; and
controlling, by the burnish controller, movement of the burnishing roller during the transport of the magnetic tape by spinning the burnishing roller at a lower speed of the abrasive shell compared to a current transport speed of the magnetic tape.

12. The computer program product of claim 11, further comprising:
receiving a cartridge, by the tape drive, the tape drive having a cartridge memory controller, the cartridge comprising the magnetic tape and a cartridge memory, the cartridge memory having stored therein state information specific to the tape;
performing, by the cartridge memory controller, read-write operations on the cartridge memory;
establishing, by the tape drive, a communicative connection between the cartridge memory controller and the cartridge memory; and
performing, by the burnish controller, read-write operations on the cartridge memory using the cartridge memory controller by spinning the burnishing roller at a lower speed of the abrasive shell compared to a current transport speed of the magnetic tape in case the state information indicates the magnetic tape is unused.

13. The computer program product of claim 12, further comprising:

performing, by the burnish controller, read-write operations on the cartridge memory using the cartridge memory controller by spinning the burnishing roller at an equal speed of the abrasive shell compared to the current transport speed of the magnetic tape in case the state information indicates the magnetic tape as used.

14. The computer program product of claim 12, further comprising:
    detecting, by the tape drive, removal of the magnetic tape wherein the state information further comprises an interrupt position;
    updating, by the cartridge memory controller, the interrupt position to the current logical position, when the state information indicates the magnetic tape as unused and that a removal of the cartridge is detected after the read-write operations of the tape head were performed until a current logical position less than a predetermined logical end-of-tape position of the magnetic tape;
    receiving, by the tape drive, the removed magnetic tape;
    detecting, by the tape drive, the interrupt position is less than the predetermined logical end-of-tape position;
    spinning, by the burnish controller, the burnishing roller at equal speed of the abrasive shell compared to the current transport speed of the magnetic tape if the current logical position of the magnetic tape is less than the detected interrupt position; and
    spinning, by the burnish controller, the burnishing roller at a lower speed of the abrasive shell compared to a current transport speed of the magnetic tape if the current logical position is equal to or greater than the detected interrupt position.

15. The computer program product as in claim 14, further comprising:
    detecting, by the tape drive, the state information indicates the magnetic tape as unused and that a removal of the cartridge is detected after the read-write operations of the tape head were performed until a current logical position less than a predetermined logical end-of-tape position of the magnetic tape;
    updating, by the burnish controller, the state information in the cartridge memory so as to indicate the magnetic tape as partially used.

16. A computer program product as in claim 11, further comprising:
    spinning, by a rotary drive, the burnishing roller, the burnish controller being adapted for controlling the movement of the burnishing roller by actuating the rotary drive.

* * * * *